US006218832B1

(12) United States Patent
Chuang et al.

(10) Patent No.: US 6,218,832 B1
(45) Date of Patent: Apr. 17, 2001

(54) NUCLEAR MAGNETIC RESONANCE QUANTUM COMPUTING METHOD WITH IMPROVED SOLVENTS

(75) Inventors: Isaac Liu Chuang, Prospect, KY (US); Mark Hull Sherwood, Los Gatos; Costantino Sheldon Yannoni, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/250,955

(22) Filed: Feb. 16, 1999

(51) Int. Cl.$^7$ ........................................ G01V 3/00
(52) U.S. Cl. .............................. 324/300; 324/307
(58) Field of Search .................... 324/300, 306, 324/307, 309, 311, 312, 314, 318, 322; 371/40.11; 712/1; 359/11

(56) References Cited

U.S. PATENT DOCUMENTS

| | | | |
|---|---|---|---|
| 5,768,297 | 6/1998 | Shor | 371/40.11 |
| 5,847,565 * | 12/1998 | Narayanan | 324/322 |
| 5,917,322 * | 6/1999 | Gershenfeld et al. | 324/307 |
| 5,940,193 * | 8/1999 | Hotaling et al. | 359/11 |
| 6,081,882 * | 6/2000 | Gossett | 712/1 |

OTHER PUBLICATIONS

Feynman, "Quantum Mechanical Computers", Optics News Feb. 1, 1995, pp. 11–20.
Cirac et al.,"Quntum Computations with Cold Trapped Ions", Physical Review Letters, vol. 74, No. 20, May 15, 1995, pp. 4091–4094.
Deutsch, "Quantum theory, the Church–Turing principle and the universal quantum computer", Proc. Royal Society London, vol. 400 1985, pp. 97–117.
Grover, "Quntum Computers Can Search Arbitrarily Large Databases by a Single Query", Physical Review Letters, vol. 79, No. 23, Dec. 7, 1997, pp. 4709–4712.
Shor, "Algorithms for Quntum Computation: Discrete Logarithms and Factoring", IEEE Press, Proceedings 35$^{th}$ Annual Symposium on Foundations of Computer Science, Nov. 1994, (1–10 pages).
Monroe et al. "Demonstration of a Fundamental Quantum Logic Gate", Physical Review Letters, vol. 75, No. 25, Dec. 18, 1995, pp. 4714–4717.
Turchette et al. "Measurement of Conditional Phase Shifts for Quantum Logic", Physical Review Letters, vol. 75, No. 25, Dec. 18, 1995, pp. 4710–4713.
Gershenfeld et al., "Bulk Spin–Resonance Quantum Computation", Science vol. 275, Jan. 17, 1997, pp. 350–356.
Cory et al., "Ensemble Quantum Computing by NMR Spectroscopy", The National Academy of Sciences of the USA, vol. 94, Mar. 1997 Computer Sciences, pp. 1634–1639.
Chuang et al.,"Experimental Implementation of Fast Quantum Searching", Physical Review Letters, vol. 80, No. 15, Apr. 13, 1998, pp. 3408–3411.

(List continued on next page.)

*Primary Examiner*—Louis Arana
(74) *Attorney, Agent, or Firm*—Thomas R. Berthold

(57) ABSTRACT

A method for nuclear magnetic resonance quantum computing (NMRQC) uses a liquid crystal solvent into which the quantum computing molecules are dissolved. The method allows implementation of more complex quantum algorithms which require execution of many logic gates over the duration of a decoherence time, allows NMRQC clock frequencies to be increased by at least an order of magnitude beyond those achievable using isotropic liquid solvents, and decreases the reinitialization times for a NMR quantum computer without decreasing the computational capability of the molecular systems.

12 Claims, 2 Drawing Sheets

OTHER PUBLICATIONS

Chuang et al., "Experimental Realization of a Quantum Algorithm", Nature vol. 393, May 14, 1998, pp. 143–146.

Chuang et al., "Bulk Quantum Computation with Nuclear Magnetic Resonance: theory and experiment", Proc. Royal Society London, 1998, pp. 454, 447–467.

Warren et al., "The Usefulness of NMR Quantum Computing", Science vol. 277, Sep. 12, 1997, pp. 1688–1690.

Saupe et al.,"High–Resolution Nuclear Magnetic Resonance Spectra of Orientated Molecules", Physical Review Letters, vol. 11, No. 10, Nov. 15, 1963, pp. 462–464.

Gershenfeld et al., "Quntum Computing with Molecules", Scientific American, Jun. 1998, pp.66–71.

Morris et al., "Enhancement of Nuclear Magnetic Resonance Signals by Polarization Transfer", Journal of the American Chem. Soc., 101:3, Jan. 31, 1979, pp. 760–762.

* cited by examiner

NUCLEAR MAGNETIC RESONANCE QUANTUM COMPUTING METHOD WITH IMPROVED SOLVENTS

TECHNICAL FIELD

This invention relates to quantum computing, and more particularly to nuclear magnetic resonance quantum computing (NMRQC).

BACKGROUND OF THE INVENTION

Quantum computing was theoretically developed by Feynman (*Optics News*, Feb. 1, 1985) and Deutsch (*Proc. Royal Soc. London* A400, 97 (1985)). Quantum algorithms for these theoretical machines were developed by Grover (*Phys. Rev. Lett.* 79, 4709 (1997)) to search unsorted databases faster than is possible with classical computers, and by Shor (*Proc. 35th Ann. Symp. on Found. of Computer Science,* IEEE Comp. Soc. Press, Los Alamitos, Calif. 1994) to factor numbers and calculate discrete logarithms. Early experimental implementations of quantum computers used ion traps (Cirac and Zoller, *Phys. Rev. Lett.* 74, 4091 (1995); Monroe et. al, *Phys. Rev. Lett.* 75, 4714 (1995)) and optical systems (Turchette et. al., *Phys. Rev. Lett.* 75, 4710 (1995)) but were able to implement only a single logic gate, one of many that would be required to implement an algorithm.

A significant theoretical advance in quantum computing came when the means for performing quantum computation using nuclear magnetic resonance (NMR) techniques was developed by Gershenfeld and Chuang (*Science* 275, 350 (1997)), and independently by Cory, Fahmy, and Havel (*Proc. Nat. Acad. Sci.* 94, 1634 (1997)). The NMR technique has successfully been used to demonstrate the operation of two-bit quantum algorithms for searching (Chuang, Gershenfeld, and Kubinec, *Phys. Rev. Left.* 80, 3408 (1998)) and period-finding (Chuang, Vandersypen, Zhou, Leung, and Lloyd, *Nature* 393, 143 (1998)).

To date, all of the efforts in NMR quantum computing (NMRQC) have involved the use of isotropic liquid solvents, into which molecules specifically suited for carrying out quantum computations are dissolved. Isotropic liquid solvents allow the molecules to tumble isotropically, and average the dipolar interactions to zero. The couplings among the spins that are required for quantum computation are thus scalar in nature. The use of isotropic liquid solvents in NMRQC also results in long coherence times, which means that there is a significant amount of time to perform a computation before external forces disrupt or affect the coupling of the nuclear spins. It has been understood that these features are highly desirable, and that solids, which have long range dipolar couplings, cause rapid decoherence and therefore offer only very reduced operation times when used for quantum computation (Chuang, Gershenfeld, Kubinec, and Leung, *Proc. Royal Soc. London* A (1988) 454, 447). Furthermore, it is known in the art that the advantages of using dipolar couplings in solids for NMRQC operations are outweighed by the disadvantages (W. S. Warren, *Science* 277, 1688, 1997).

However, the use of liquid solvents strongly limits the clock rate and thus the computation speed of NMR quantum computers because the requisite coupling among the nuclear spins that persists in solution, the so-called scalar coupling, is small. NMR quantum computers based on liquid solvents also require long waiting times between computations for reinitialization because of the long time required for buildup of the requisite longitudinal nuclear spin magnetization.

The use of liquid crystals as a solvent for NMR experiments was developed for retaining and extracting information from the dipolar interactions among nuclei in the dissolved molecules (A.Saupe and G. Englert, *Phys. Rev. Lett.* 11, 462 (1963). In contrast with isotropic liquid solvents, liquid crystal solvents impede the tumbling of dissolved molecules in such a way that the molecules become partially oriented. The result on the NMR spectra is that dipolar couplings between nuclear spins that are averaged to zero in isotropic liquid solvents are observed in liquid crystal solvents. However, liquid crystals have not been used as solvents for NMRQC. This is because it was believed that liquid crystal solvents which induce dipolar couplings would require unduly complex implementation of NMRQC algorithms.

What is needed is a NMRQC system that increases the computation speed and reduces the re-initialization time over NMRQC systems that rely on liquid solvents.

SUMMARY OF THE INVENTION

The present invention is a method for performing NMRQC wherein the quantum computing molecules are dissolved in a liquid crystal. The dissolution of the quantum computing molecules in a liquid crystal solvent removes the limitation on the clock speed of an NMR quantum computer, which was previously determined by the size of the magnetic couplings between the spins in the atoms of the quantum computing molecules dissolved in an isotropic liquid. The method allows implementation of more complex NMRQC algorithms which require execution of many logic gates over the duration of a decoherence time. The method allows NMRQC clock frequencies to be increased by at least an order of magnitude beyond those achievable using isotropic liquid solvents. The method also decreases the reinitialization times for a NMR quantum computer without decreasing the computational capability of the molecular systems. The method makes possible the use of new molecules for NMR quantum computation.

For a fuller understanding of the nature and advantages of the present invention, reference should be made to the following detailed description taken together with the accompanying figures.

DESCRIPTION OF THE PREFERRED EMBODIMENTS

Figure 1:
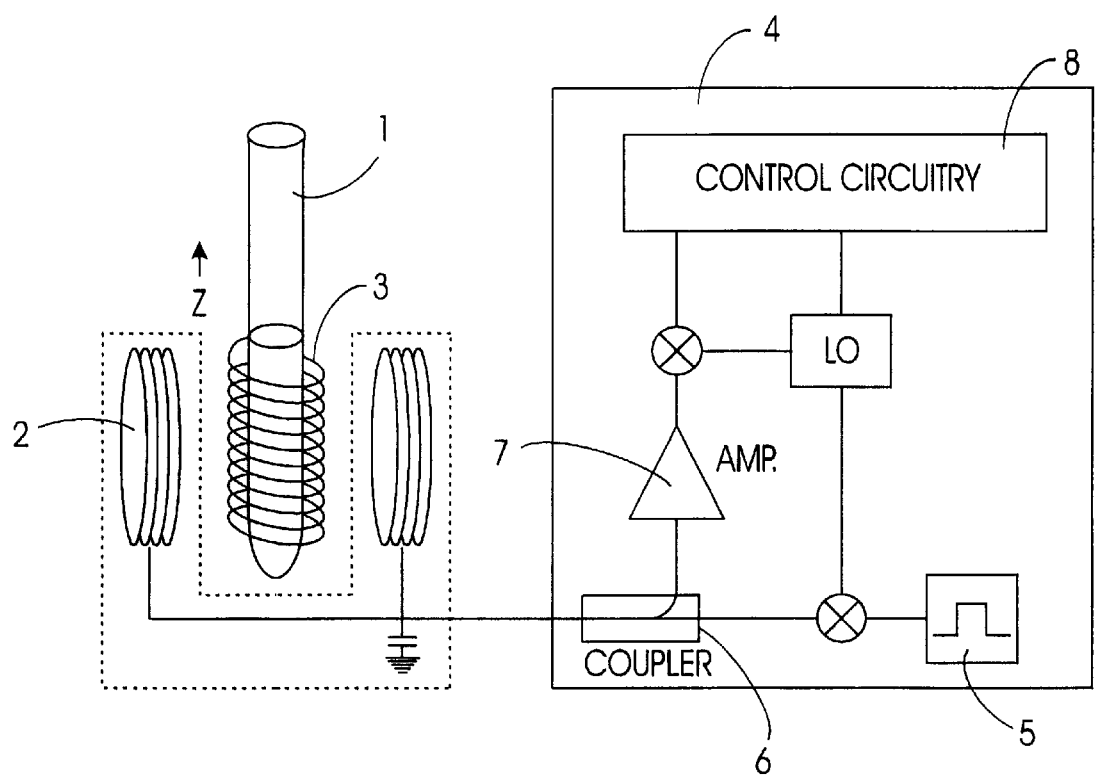
FIG. 1 is a block diagram of a NMR spectrometer for performing quantum computation.

NMR quantum computing (NMRQC) is performed in a commercially available NMR spectrometer, a block diagram of which is shown in FIG. 1. The basic components are a container 1 containing the sample, i.e., the quantum computing molecule dissolved in a solvent, a magnet 2 for applying a constant DC magnetic field in the Z direction to the sample, a probe 3 equipped with a tuned circuit for generating a radio-frequency (rf) alternating magnetic field in a direction perpendicular to the Z direction, and a control console 4. The console 4 includes a rf source and pulse generator 5 for exciting the probe 3, a directional coupler 6 for directing the response signal, and an amplifier 7 for amplifying the response signal. The console 4 also includes control circuitry 8, such as Fourier transform circuitry for converting the time decay of the response signal to a frequency spectrum.

Quantum computing can be performed in an NMR system like that of FIG. 1 by applying specific sequences of rf pulses to represent logic gates to the sample to affect the nuclear spins (called quantum bits or "qubits") of the atoms in the molecules, and reading out the result by inspecting the spectrum of the time-varying voltage induced by the precession of the nuclear spins. NMRQC thus differs from conventional NMR because the specific sequences of rf pulses are designed to represent logic gates for quantum computation. For example, in a $^{13}$C-enriched chloroform molecule, it is the interaction between the spins of the hydrogen and carbon nuclei that is of interest in NMR. An rf pulse will rotate the carbon's spin downward into the horizontal plane, and the carbon nucleus will then precess in a direction around an axis perpendicular to the plane that depends on whether or not the spin of the hydrogen nucleus also happens to be parallel to the applied dc field. The carbon spin will then point in one direction or the opposite direction depending on whether the spin of the neighboring hydrogen nucleus was parallel or antiparallel to the applied dc field. At that moment, i.e., a specific delay time later, another rf pulse is applied to rotate the carbon nucleus another 90 degrees, and that causes the carbon nucleus to flip between the down position (if the hydrogen's spin was up) or into the up position (if the hydrogen's spin was down). This sequence of rf pulses and delays is a basic building block used both in the construction of NMRQC logic gates, and also in the design of conventional polarization transfer experiments, such as INEPT (*Journal Am. Chem. Soc.* (1979), 101, 760–762). In the context of NMRQC, this pulse sequence, as described by (Chuang, Gershenfeld, Kubinec, and Leung, *Proc. Royal Soc. London* A (1988) 454, 447–467) corresponds to a portion of a controlled-not (CNOT) logic gate because the state of one input controls whether the signal presented at the other input is inverted at the output, in such a manner that a superposition of inputs is transformed into the proper corresponding superposition of outputs with the proper relative phases, as demonstrated in FIG. 1(c) of the paper by Gershenfeld and Chuang (*Science* 275, 350 (1997)).

Algorithms are implemented by executing sequences of logic gates. The experimental realization of the Deutsch-Jozsa quantum algorithm in a NMR system using chloroform molecules in a liquid acetone solvent has been reported by Chuang, Vandersypen, Zhou, Leung, and Lloyd, "Experimental realization of a quantum algorithm", *Nature*, Vol. 393, May 14, 1998, pp. 143–146. The implementation of Grover's quantum algorithm for searching for a particle in any of 4 boxes has been reported by Gershenfeld and Chuang, *Scientific American*, June 1998, pp. 66–71.

The present invention is a NMRQC system that uses the NMR system of FIG. 1, but wherein the solvent in the sample is a liquid crystal. The first advantage of the liquid crystal solvent is an increase in the NMRQC's clock cycle frequency ($f_{clock}$), which is the inverse of the time it takes to execute a logic gate. A gate comprises one or two short (10 microsecond) rf pulses separated by a delay during which no rf excitation is applied, such as used in the portion of the CNOT logic gate described above. The length of the delay between rf pulses is 1/(2J), where J is the strength of the spin coupling among the nuclei in the quantum computing molecule. (Chuang, Gershenfeld, Kubinec, and Leung, *Proc. Royal Soc. London* A 454, 447). Values of J in a liquid solvent are about 100 Hz, resulting in a delay of 5 millisecond and $f_{clock}$ of 200 Hz. For example, the Deutsch-Jozsa quantum algorithm that was carried out using chloroform dissolved in liquid acetone solvent had a spin coupling of relevance (J=215 Hz), which corresponds to a $f_{clock}$ of 430 Hz. In contrast, performing this same algorithm in a liquid crystal solvent of [para-octylphenyl-2-chloro-4(para-heptyloyloxy)benzoate], the $f_{clock}$ would be 9,456 Hz because the relevant dipole spin coupling D=4,728 Hz.

The higher clock frequency gained by using liquid crystals as the solvents also permits the implementation of algorithms which may be too complex using liquid solvents if $T_2$, the decay time of transverse nuclear spin coherence generated by the rf pulses, is not significantly altered by the use of the liquid crystal solvent. Complex algorithms require execution of a large number of logic gates but must be completed in a time less than $T_2$. The maximum number of quantum gates achievable in NMRQC is given by $T_2 \times f_{clock}$ (approximately $T_2 \times 2 \times$ the strength of the relevant coupling). While $T_2$ is about the same for small molecules in liquid and liquid crystal solvents, the coupling is larger in liquid crystal solvents, thereby allowing execution of a larger number of gates. Thus there may be complex quantum algorithms which can only be implemented with the use of liquid crystal solvents. For example, $T_2$ for the $^{13}$C nucleus in chloroform dissolved in acetone is 0.3 seconds, meaning that approximately 0.3×430=129 gates can be executed using this sample. On the other hand, $T_2$ for the $^{13}$C nucleus in chloroform dissolved in a liquid crystal solvent of [para-octylphenyl-2-chloro-4(para-heptyloyloxy)benzoate] is 0.33 seconds, so that 0.33×9,456=3,120 gates can be executed using this sample.

The use of liquid crystal solvents also decreases the re-initialization time, i.e., the minimum time that must lapse before an NMRQC algorithm can be repeated. The reason for this is that before an algorithm can be implemented using NMRQC, it is necessary to wait five (5) times the time ($T_1$) it takes to polarize the nuclear spins (qubits) in the external magnetic field. Since $T_1$ is shorter in liquid crystal solvents, algorithms can be repeated much more quickly than in liquids. For example, $T_1$ for the carbon spins in chloroform dissolved in liquid acetone solvent is 25 seconds, but only 1 second in a liquid crystal solvent of [para-octylphenyl-2-chloro-4(para-heptyloyloxy)benzoate]. Therefore a savings of 25 in time will be realized every time a quantum computing algorithm is executed using chloroform in this liquid crystal solvent, as opposed to a liquid solvent. Since a large number of experiments is required to set up the NMR spectrometer and to diagnose quantum computations, this time savings can be considerable. Even for the simplest NMRQC experiments involving 2 spins (2 qubits), a variety of calibration experiments are required before computations can be performed. The debugging of quantum algorithms such as Grover's search algorithm is performed using a procedure known as quantum state tomography (Chuang, Gershenfeld, Kubinec, and Leung, *Proc. Royal Soc. London* A 454, 447). This procedure, when operating on N qubits, requires approximately $4^N$ experiments. For example, when N=2, this is 16, and for N=3, this gives 64. Thus, it is clear that factors like a 25 savings in time per experiment will become increasingly important as the number of qubits increases.

Finally, the nature of the coupling among spins in liquid crystal solvents enlarges the choice of molecules suitable for NMRQC. Coupling among nuclear spins in molecules dissolved in isotropic liquid solvents is derived from a through-bond, "scalar" mechanism, requiring that the atoms with which the spins/qubits are associated be bonded to one another. However, nuclear spins on molecules dissolved in liquid crystal solvents experience, in addition to scalar coupling, a typically larger "dipolar" interaction with other spins in the same molecule, the strength of which is inversely proportional to the third power of the interspin distance. Therefore, since the only requirement for a dipolar interaction is proximity, there is no requirement that atoms carrying the nuclear spins be bonded to one another. Removal of the bonding requirement dramatically expands the potential library of molecules suitable for NMRQC. For example, the cis H-F pair of nuclei in trifluoroethylene is almost unusable for quantum computation when dissolved in an isotropic liquid solvent, because the coupling strength J is only about 4 Hz. However, in a liquid crystal solvent, the coupling strength D of the same pair increases to above 1450 Hz, making it usable for NMRQC.

Liquid crystals comprise a broad class of materials, many of which have been used as solvents to do classical NMR spectroscopy, as described in *NMR Spectroscopy Using Liquid Crystal Solvents*, J. W. Emsley and J. C. Lindon, Pergammon Press, Oxford 1975. The liquid crystal para-octylphenyl-2-chloro-4(para-heptyloyloxy)benzoate (available from ACROS Organic Chemicals) is but one example of this class. For purposes of the present invention a liquid crystal is a material in which the molecules achieve alignment in an external magnetic field. These include smectic, nematic, discotic and cholesteric types of liquid crystals. On the one hand, liquid crystal molecules undergo motions which are characteristic of isotropic liquids; on the other hand, because of their shape and structure, they experience anisotropic intermolecular forces. These forces, electrical in nature, cause large numbers of liquid crystal molecules to align with each other (for example, like matches in a match box), leading to domain formation. No external field is needed for this self-alignment. Such liquid crystal domains have electric and magnetic characteristics which are greatly enhanced over those of the individual molecules. The degree of alignment (orientation) in magnetic fields is proportional to the product of the square of the strength of the external field, i.e., the diamagnetic anisotropy of the material (molecule) being oriented, and the diamagnetic energy. Thermal fluctuations (molecular motion) disrupt such orientation and a measure of orientation is given by the diamagnetic energy divided by the thermal energy, a ratio S called the orientation factor. The magnetic anisotropy of a single molecule is far too small to achieve much orientation in magnetic fields available in the laboratory, and an estimate of S for a single molecule (even a liquid crystal molecule—not a domain of liquid crystal molecules) would be on the order of $10^{-4}$. Therefore, isotropic liquids simply do not orient significantly in external magnetic fields. Liquid crystals, however, with the highly enhanced magnetic anisotropy characteristic of domains of large numbers of aligned molecules, are strongly oriented in the magnetic fields typically used in NMR. Values of S close to 1 have been achieved. When a solute molecule (like chloroform) is dissolved in such a liquid crystal solvent, the forces between the solute molecules and the aligned liquid crystal molecules result in an orientation of the solute molecule, and values of S for solutes as high as 0.1 are readily achieved. This partial alignment results in the retention of couplings between spins within the solute molecule (dipolar couplings, which are of interest here) which change the nature of the NMR spectrum. Because of the motion of the solute molecules with respect to the solvent molecules, no couplings between spins in the solute and solvent are retained. Thus, the added spectral effects are only due to couplings between spins within the solute molecule. Since there are a relatively small number of spins in the solute molecule (as opposed to the much larger liquid crystal molecules), the spectra are still well resolved.

In the case of the solute molecule in the NMRQC system of the present invention, chloroform is one of a very large class of molecules that is suitable. In the present invention the solute molecule must have N magnetically active nuclei to be used for a quantum algorithm involving N qubits and must be soluble in a liquid crystal. Also, as will be described below, the preferred solute molecule is one which yields a first-order NMR spectrum, i.e., one in which the dipolar coupling strength between the nuclear spins is very small compared to the difference in the resonant frequencies of the spins.

The present invention as described above can be better understood by the following theoretical analysis, which explains how liquid crystals, which would be considered as undesirable solvents for NMRQC, can be used to enhance NMRQC.

The relevant behavior in an NMRQC experiment of two nuclear spins A and B in a molecule dissolved in a conventional liquid solvent can be described by the Hamiltonian operator:

$$H_{liquid} = h\omega_A I_{zA} + h\omega_B I_{zB} + hJ I_{zA} I_{zB} \qquad \text{(Eq. 1)}$$

where h is Planck's constant, $\omega_A$ is the resonance frequency of spin A, $\omega_B$ is the resonance frequency of spin B, $I_{zA}$ is the z-angular momentum oprerator for spin A, $I_{zB}$ is the z-angular momentum operator for B, $I_{zA}I_{zB}$ is the angular momentum operator for the coupling among spins, and J is the strength of the spin coupling that persists in a liquid, the "scalar" coupling. The clock frequency, $f_{clock}$, for NMR quantum computing is given by 2J. The J coupling is typically 100 Hz in conventional liquid solvents, meaning $f_{clock}$=200 Hz.

On the other hand, the two spins in the same molecule dissolved in a liquid crystal solvent are best described by the Hamiltonian operator:

$$H_{liquid\ crystal} = h\omega'_A I_{zA} + h\omega'_B I_{zB} + hJ I_{zA} I_{zB} + hD\{2I_{zA}I_{zB} - 0.5(I_{xA}I_{xB} + I_{yA}I_{yB})\} \qquad \text{(Eq. 2)}$$

A new dipolar term, the last on the right, appears because of the hindered molecular motion imposed by the liquid crystal solvent. The coupling strength, D, is typically 100 Hz to 10,000 Hz, and originates from a direct dipole-dipole magnetic interaction between the two nuclear spins. The dipolar interaction defined above in Eq. 2 does not have the simple form for the spin-spin coupling that is considered useful for NMRQC, and thus liquid crystals would be considered as undesirable solvents for NMRQC. However, if the qubits in a quantum computer solute molecule yield a first-order NMR spectrum, i.e., a spectrum in which the ratio $D/(\omega'_A - \omega'_B)$ is much less than one, then the Hamiltonian for a molecule dissolved in a liquid crystal simplifies to the form:

$$H_{liquid\ crystal} = h\omega'_A I_{zA} + h\omega'_B I_{zB} + h(J+D) I_{zA} I_{zB} \qquad \text{(Eq. 3)}$$

Eq. 3 is identical to Eq. 1 (the Hamiltonian for a molecule dissolved in an isotropic liquid) except that J has now been replaced by J+D. This Hamiltonian describes two spins with widely spaced NMR frequencies interacting with a coupling constant J+D leading to 2-qubit computations with $f_{clock}=2$(J+D) Hz, a clock frequency that will typically be much higher than 2J. The use of liquid crystals as a solvent for performing quantum computations in this manner is new.

In principle, any technique that increases the size of the observable coupling between spins in a molecule used for NMRQC, yet retains the necessary spectral resolution should work. Very large electric or magnetic fields could be used for this purpose, but these are much less effective than the use of liquid crystal solvents. Moreover, the use of liquid crystal solvents allows NMRQC to be preformed using conventional commercially available NMR equipment.

Figure 2:
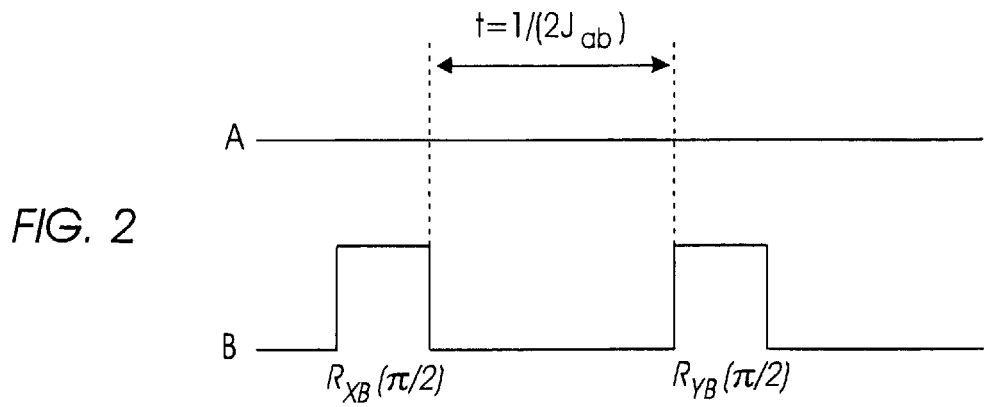
FIG. 2 is a time course for the excitation sequence used to implement a portion of a controlled-not (CNOT) gate with rf pulses in a two-spin (qubit) NMRQC system.
Figure 3A:
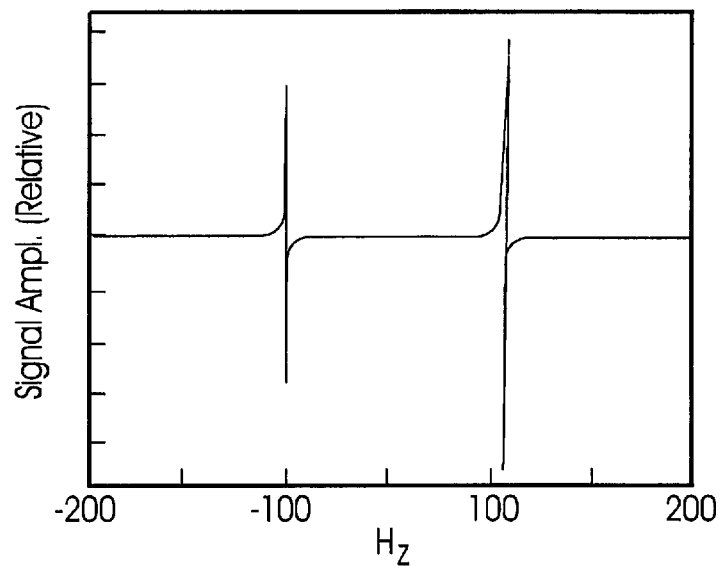
FIG. 3A is the Fourier transform of the time readout of the proton (A channel) NMR signals after implementation of a portion of the CNOT gate using the pulse sequence in FIG. 2, followed by a conventional readout pulse, wherein the NMR molecule is carbon-13 enriched chloroform dissolved in a conventional isotropic liquid.
Figure 3B:
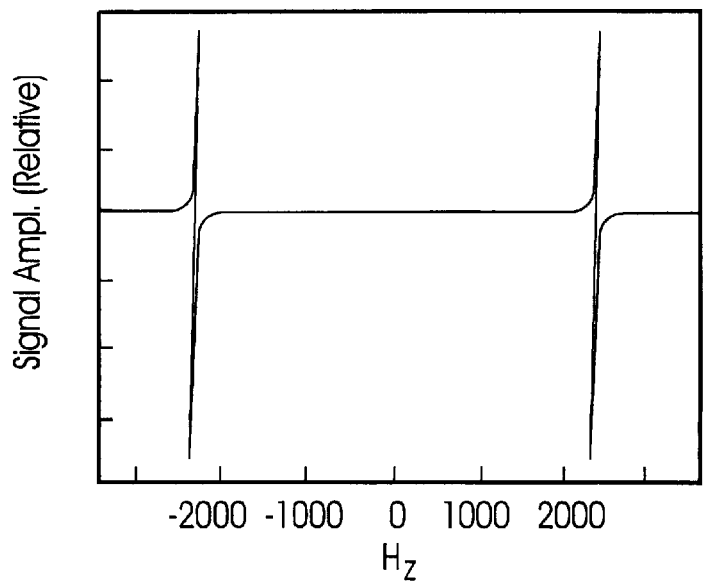
FIG. 3B is the Fourier transform of the time readout of the proton (A channel) NMR signals after implementation of a portion of the CNOT gate using the pulse sequence in FIG. 2, followed by a conventional readout pulse, wherein the NMR molecule is also carbon-13 enriched chloroform, but wherein the solvent is a liquid crystal solvent.

Referring now to FIG. 2, there is illustrated a time course for the excitation sequence used to implement a portion of the CNOT gate with rf pulses in a two-spin (qubit) NMRQC system. The length of each of the rotation pulses, $R_{xB}(\pi/2)$ and $R_{yB}(\pi/2)$, is about 10 microseconds, and the delay t depends on the strength of the coupling between the two spins (J). When extra refocusing and phase compensating pulses are added as described by Gershenfeld and Chuang (*Science* 275, 350 (1997)), this sequence becomes a true CNOT logic gate with proper relative phases as required for quantum computing. FIG. 3A is the Fourier transform of the time readout of the proton (A channel) NMR signals after implementation of the portion of the CNOT gate using the pulse sequence in FIG. 2, followed by a conventional readout pulse, wherein the NMR molecule is carbon-13 enriched chloroform dissolved in fully deuterated acetone (an isotopic liquid solvent). FIG. 3B is the Fourier transform of the time readout of the proton (A channel) NMR signals after implementation of the portion of the CNOT gate using the pulse sequence in FIG. 2, wherein the NMR molecule is also carbon-13 enriched chloroform, but wherein the solvent is the liquid crystal solvent [para-octylphenyl-2-chloro-4 (para-heptyloyloxy)benzoate]. The frequency spread is 215 Hz (J=215 Hz) for FIG. 3A and 4675 Hz (J+D=4,675 Hz) for FIG. 3B. This means that the delay time t=1/(2J) is reduced from 2.326 ms to 0.107 ms by the use of the liquid crystal solvent. Thus a single CNOT logic gate can be implemented in about 1/22 the time it would take using a conventional isotropic liquid solvent.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for increasing the clock speed of a nuclear magnetic resonance quantum computer comprising immersing quantum computer solute molecules in a liquid crystal solvent to enable the use of dipolar couplings.

2. A method according to claim 1 wherein the liquid crystal solvent is para-octylphenyl-2-chloro-4(para-heptyloyloxy)benzoate.

3. A method according to claim 1 wherein the quantum computer solute molecule is carbon-13 enriched chloroform.

4. A method for decreasing the time required to re-initialize a nuclear magnetic resonance quantum computer (NMRQC) without decreasing the total number of operations which an NMRQC is capable of performing, the method comprising providing a liquid crystal solvent for the quantum computing solute molecules.

5. A method according to claim 4 wherein the liquid crystal solvent is para-octylphenyl-2-chloro-4(para-heptyloyloxy)benzoate.

6. A method according to claim 1 wherein the quantum computer solute molecule is carbon-13 enriched chloroform.

7. A method for quantum computation in a nuclear magnetic resonance system having a container for holding quantum computing molecules, a magnet for applying a magnetic field to the quantum computing molecules, a source for generating radio-frequency (rf) alternating magnetic field pulses to the quantum computing molecules, and circuitry for detecting the response signal from the quantum computing molecules in response to the rf magnetic field pulses, the method comprising:

providing liquid crystal molecules in the container as a solution for the quantum computing molecules;

generating a predetermined sequence of rf pulses representing a logic gate to the quantum computing molecules in the liquid crystal solvent; and detecting the signal from the quantum computing molecules in response to the applied logic gate.

8. A method according to claim 7 wherein the liquid crystal solvent is para-octylphenyl-2-chloro-4(para-heptyloyloxy)benzoate.

9. A method according to claim 7 wherein the quantum computer molecules are carbon-13 enriched chloroform molecules.

10. A method according to claim 7 wherein generating a predetermined sequence of rf pulses comprises generating a controlled-NOT logic gate.

11. A method according to claim 7 wherein the quantum computer molecule includes two nuclei, each with a spin having a resonant frequency, and wherein the difference in the resonant frequencies of the two nuclear spins is substantially larger than strength of the magnetic coupling between the spins of the two nuclei.

12. A method according to claim 7 wherein the decay time of transverse nuclear spin coherence generated by the rf pulses in the system of quantum computing molecules dissolved in the liquid crystal solvent is not significantly different from the decay time of transverse nuclear spin coherence generated by the rf pulses in a system of quantum computing molecules dissolved in an isotropic liquid solvent, whereby more complex sequences of logic gates representing quantum algorithms can be performed.

* * * * *